United States Patent [19]
Moscrip

[11] Patent Number: 5,146,750
[45] Date of Patent: Sep. 15, 1992

[54] MAGNETOELECTRIC RESONANCE ENGINE

[75] Inventor: William M. Moscrip, Arlington County, Va.

[73] Assignee: Gordon W. Wilkins, Warsaw, Va.

[21] Appl. No.: 691,003

[22] PCT Filed: Aug. 21, 1990

[86] PCT No.: PCT/US90/04744
§ 371 Date: Jun. 18, 1991
§ 102(e) Date: Jun. 18, 1991

[51] Int. Cl.⁵ ............................................. F02G 1/045
[52] U.S. Cl. ....................................................... 60/517
[58] Field of Search ............................ 60/517, 525, 526

[56] References Cited
U.S. PATENT DOCUMENTS 4,458,489 7/1984 Walsh ...................................... 60/520
4,873,826 10/1989 Dhar ...................................... 60/520

Primary Examiner—Allen M. Ostrager
Attorney, Agent, or Firm—Bell, Seltzer, Park & Gibson

[57] ABSTRACT

A machine which combines an Alpha-type Stirling cycle thermal machine and a magnetoelectric resonance mechanism adaptable to be useful both as an electric generator and an electric heat pump, such a Stirling cycle resonance machine has a simplified mechanical arrangement with a minimum number of moving parts within a hermetically sealed and permanently lubricated housing, is fully automatic, self-starting, and self-regulating in operation in that the mechanical motion of the pistons is maintained in appropriate phase relationship by an electronic quadrature phase-locking circuit. It can readily use multiple fuels as an electric generator and multiple electric power sources (DC or AC) as an electric heat pump.

4 Claims, 9 Drawing Sheets

AIR-CIRCUIT

IRON-CIRCUIT
(NULL POSITION)

AIR-CIRCUIT

MAGNETOELECTRIC RESONANCE ENGINE

DESCRIPTION

1. Field of the Invention

This invention relates to Stirling cycle machines, also known as regenerative thermal machines, and more particularly to a new type of mechanical arrangement for an Alpha type Stirling thermal machine which employs resonance-tuned pistons within a hermetically sealed and permanently lubricated housing. In one configuration, both the expansion piston and the compression piston carry an integral permanent magnet armature assembly, each of which oscillates within and either drives or is driven by an exterior stator coil. The motion of the pistons is maintained in an appropriate phase relationship by means of a unique electronic quadrature phase-locking circuit and is devoid of the gears, bearings, flywheels, crankshafts, pistons rods, seals, and other such complex and unreliable components common to traditional Alpha machine designs. The invention is a machine, novel in construction and operation (Magnetoelectric Resonance Engine), and can be expected to have broad application both as an electric generator (Magnetoresonant Generator) and as an electric heat pump (Magnetoresonant Heat Pump). It was the subject of Disclosure Document No. 228179, received in the U.S. Patent and Trademark Office on May 30, 1989.

In the field of generators, Magnetoresonant Generators produce both 12-volt DC and standard 120-volt AC electricity, for example, in order to provide quiet, compact, convenient, and economical power sources for boats, camping equipment, construction sites, and countless other portable, remote, mobile, or standby power applications. These applications may be broadly categorized as follows: (1) portable power systems; (2) marine power systems; (3) remote power systems; (4) residential power systems; (5) industrial power systems; (6) health care power systems; (7) military power systems; (8) space power systems; and (9) Stirling-electric drive or propulsion systems. In the field of heat pumps and refrigerators, Magnetoresonant Heat Pumps consume electric power in order to produce heating and cooling effects in all manner of heat pump, refrigerator, air conditioning, cooling, chilling, and freezing devices and applications.

2. Description of the Prior Art

The Stirling cycle engine is a reciprocating heat engine which operates by transferring heat from an external source into the cylinder through a solid wall, rather than by exploding a fuel-air mixture within the cylinder. This is known as an external combustion engine (although the heat may come from sources other than burning fuel such as solar or nuclear), as opposed to the familiar 10 internal combustion engine. The heat is transferred to an internal gaseous working fluid which is sealed within the cylinder and undergoes closed cycle heating, expansion, cooling, and compression, alternately flowing back and forth 15 through a thermal storage device known as a regenerator.

As more fully described in earlier Moscrip U.S. Pat. Nos. 4,413,473; 4,413,474; 4,413,475; and 4,429,732; heat is supplied continuously in one part of the machine, called the heater, and is removed continuously in another part of the machine called the cooler. The regenerator picks up heat when the gas goes from the hot side to the cold side and gives up heat to the gas when it is moving in the opposite direction. The simplest Stirling engine configuration, known as the Alpha configuration, is one in which there are one or more pairs of sealed pistons, one, a compression piston and the other, an expansion piston. The motion of one piston leads the motion of the other piston by a mechanical phase angle of approximately ninety degrees. The phase angle is often prescribed by the design of a crankshaft, swashplate, or other mechanical element.

The continuous burning of fuel attainable in engines employing external as opposed to internal combustion permits the achievement of high temperatures and other conditions which result in complete combustion. This in turn leads to exceptionally low levels of undesirable components the exhaust emissions. Because the pistons reciprocate with smooth harmonic motion, and because there are no abrupt periodic detonations inside the cylinder, the operation of Stirling engines can be unusually quiet. Because the heat required can be obtained from virtually any source, Stirling engines can be designed to run on a large variety of fuels or multiple fuels. And because of their inherently high efficiency and low exhaust emissions, economical operation is possible.

Surprisingly, the first Stirling engine was patented in 1816 by a Scottish clergyman, Robert Stirling. These machines were known as hot air engines throughout the 19th century, during which they were improved by a number of famous engineers of the period, among them John Ericsson, who built the Monitor during the Civil War. By the 1920's the internal combustion engine, as well as the steam engine and the electric motor, had all but eliminated the Stirling engine from the marketplace and consigned it to the world's history and technology museums.

The hot air engine might have been forever relegated to the museum if the Dutch firm, N. V. Philips, had not taken an interest in such machines in 1937. A manufacturer of portable radio equipment, N. V. Philips was interested in the engine for its potential application as a compact and quiet power source which, because of its spark-free operation, would create no radio interference. These efforts led to the development of contemporary Stirling cycle engines which utilize either hydrogen or helium as the working fluid and which incorporate modern developments in materials technology.

Today's Stirling engines exhibit excellent thermal efficiency, multiple fuel capability, quiet operation, and favorable torque characteristics. Modern designs are the direct result of increased operating temperatures and heat transfer rates, decreased complexity of mechanical arrangements, and the availability of superior materials. But they remain predominately confined to the laboratory, with the exception of a few specialized and high-dollar market applications such as space power and cryogenic coolers, because existing machines are invariably too complex, costly, and unreliable to compete with the available alternatives in more commonplace fields.

Conventional mechanical arrangements tend to borrow heavily from traditional internal combustion engine designs, which are incompatible with optimum Stirling engine design. This is because the Stirling machine needs different hardware to introduce, to control, and to eliminate heat. The conventional use of hydrogen and helium as gaseous working fluids imposes the additional expense of exotic materials and coatings, because these gases are difficult to contain and because they make ordinary engine materials brittle. In addition, their use necessitates the incorporation of intricate seals in the design, increasing friction, decreasing reliability, and adding to the overall production cost.

The mechanical arrangements of Stirling engines are generally divided into three groups known as the Alpha, Beta, and Gamma arrangements, after D. W. Kirkley (Reference 1). Alpha engines have pairs of sealed pistons in separate cylinders which are connected in series by a heater, a regenerator, and a cooler. Both Beta and Gamma engines are defined by the use of a classic piston-displacer arrangement, the Beta engine having both the displacer and the piston in the same cylinder, while the Gamma engine uses separate cylinders (Reference 2).

The principal distinction between a piston and a displacer is that pistons are, and displacers are not, provided with a nominally gas-tight fluid seal to prevent the passage of gas from one side to the other during normal operation. Thus there is usually a more substantial pressure gradient created by the operation of a piston than by that of a displacer. A displacer does no work on the gas in general, but merely displaces it from one place to another whereas work is done on the gas by a piston, or on a piston by the gas, as the piston moves within the cylinder.

The mechanical arrangements of Stirling engines are also often broadly divided into two primary groups, namely kinematic and free piston engines (References 2 and 3). The term kinematic drive is commonly used to describe any arrangement of cranks, connecting rods, swash plates, cams, and other mechanical dynamic components which serve to contrain the motion of either pistons or displacers within a prescribed phase relationship, producing useful output power by conventional mechanical means such as a rotating shaft. The term free piston drive commonly describes Stirling engines wherein the inherent working fluid pressure variations and other thermodynamic and gasdynamic forces are employed by a given design to achieve the appropriate phase angle, work being removed by a device such as a linear alternator or a hydraulic pump.

The invention of the basic free piston Stirling engine in the early 1960s is generally attributed to William T. Beale (References 4, 5, and 17). The independent discovery of similar engines is attributed to E. H. Cooke-Yarborough and C. D. West of the Atomic Energy Research Establishment, Harwell, England (References 6, 7, and 8). G. M. Benson also made important contributions to this segment of the prior art and patented many novel free piston engines. Others have since been working on various modifications of and improvements to the original free piston design concepts (References 9, 10, 11, and 12). Free piston engines are undergoing intensive investigation by NASA for space power applications because of their potential for long life, high reliability and efficiency, low vibration, and relatively low noise (Reference 13).

Virtually all of the existing free piston engine designs currently being developed incorporate piston and displacer arrangements, i.e., they are either Beta or Gamma type machines. Free piston engines of the Alpha type are unknown, although they might be expected to embody less complicated designs and to have therefore a lower production cost. However, the present invention is believed to be essentially different from and superior to either kinematic engines or free piston engines by virtue of the fact that it relies upon a unique combination of mechanical dynamic thermodynamic and gasdynamic, and electrodynamic and magnetodynamic forces to maintain the prescribed phase relationship among the pistons of an Alpha type Stirling cycle machine. While it lacks the complex and costly mechanical components of kinematic engines, the present invention's pistons do not execute free piston motion but are strongly constrained by electrodynamic and magnetodynamic forces in a quasi free piston manner.

SUMMARY OF THE INVENTION

The Magnetoelectric Resonance Engine disclosed herein comprises, in a preferred embodiment, the following elements:

(1) A unique Stirling cycle Alpha type quasi free piston mechanical arrangement having one or more pairs of opposed pistons in a single hermetically sealed cylinder wherein each of the pistons (i) carries a permanent magnet structure configured so as to provide an alternating magnetic flux with respect to a stationary external coil winding; (ii) is designed to have a given natural frequency of mechanical vibration or resonance, equal to the nominal electrical operating frequency of the machine (i.e., the power output frequency of an electric generator or the power input frequency of an electric heat pump); and (iii) is arranged to oscillate within the external coil winding in the manner of a classic two-degree-of-freedom spring-mass system undergoing forced damped vibration, each of the two masses being forced under the action of the coil to vibrate with a prescribed phase angle with respect to the other.

(2) A novel electronic quadrature phase locking circuit external to the sealed working volume which in turn consists of (i) a two-phase solid state power semiconductor "ferroresonant" magnetic-coupled multivibrator power converter designed to operate e with an electrical resonance equal to the natural mechanical resonance, of the pistons and to maintain the prescribed phase angle by the nonlinear action of two magnetic core saturable-reactor devices utilizing feedback techniques; and (ii) a secondary electrochemical cell, or rechargeable storage battery, with sufficient capacity to provide starting current to the system and to accommodate anticipated load variations by providing supplemental current to the drive coils with the appropriate frequency and phase being governed by the design of the circuit.

(3) Various ancillary subsystems such as liquid or gaseous fuel combustors, combustion air blowers, coolant circulating pumps, specialized heat exchangers, power line isolation, synchronization, and stabilization equipment, frequency converters, process controllers, energy storage devices and the like which may be required in the context of a specific Magnetoelectric Generator or Magnetoelectric Heat Pump application. In the electric generator mode, for example, steady combustion of either gaseous (propane, natural gas, LPG) or liquid (gasoline, diesel, kerosene, alcohol) fuels is required for the production of useful electric power output. On the other hand, an electric heat pump designed in accordance with the invention would have no combustion subsystem, but may operate in conjunction with a groundwater heat source and a forced-air ventilation subsystem.

(4) A master microcomputer control system in which, depending upon the specific application of the invention, the various ancillary subsystems with integrated feedback transducers are assembled, monitored, and operated to achieve a specific result. The combustion subsystem for a Magnetoelectric Generator, for example, is controlled so as to maintain a specified set point temperature within the heater, to name one of many similar necessary functional operating parameters. The controller for a Magnetoelectric Heat Pump, however, would only be required to monitor and control ambient and process temperatures, flow rates, and various other parameters required by that specific application of the device for which it is designed and operated.

The essence of the new technology disclosed hereunder is the discovery and implementation of a relatively simple method for coupling and controlling a resonant mechanical vibrator which embodies an appropriate Stirling cycle thermodynamic system with a similarly resonant electrical vibrator which embodies an appropriate electrodynamic system so as to achieve a reversible transfer of power between the two systems. Although the present invention bears a superficial resemblance to certain free piston machines of the prior art, especially those having hermetically sealed enclosures and linear alternator outputs, none of the prior art teaches the use of a linear alternator on both pistons of an Alpha type machine in conjunction with both mechanically and electrically resonant components such that there is no free piston motion under the accepted definition of that term.

An Alpha type mechanical arrangement, deliberately designed to conform to the specific requirements of a resonance-tuned two-degree-of-freedom spring-mass system undergoing forced damped vibration, is a new departure. When the two forcing functions defined by such a system are in turn derived from and made a part of a pair of oscillating electrical tank circuits which are electronically locked in the precise phase angle required for Stirling cycle operation, which phase angle is thereby imposed upon the vibrating mechanical system, a novel machine results. Thus the Magnetoelectric Resonance Engine constitutes a new and revolutionary approach to the design of Stirling cycle machines which promises compact configuration, quiet operation, high reliability, and low production cost.

STATEMENT OF THE OBJECTS OF THE INVENTION

It is a primary object of the invention to provide a new and improved family of Alpha type Stirling cycle machines which are mechanically uncomplicated and economical to produce on a large scale, and which have a compact hermetically sealed configuration, quiet and automatic operation in either an electric generator mode or an electric heat pump mode, and the highest possible degree of reliability.

It is another object of the invention to provide a unique quasi free piston mechanical arrangement having one or more pairs of opposed pistons in a single hermetically sealed cylinder whereby the traditional use of cranks, connecting rods, swash plates, cams and other mechanical components normally used to constrain the motion of the pistons in the requisite phase relationship are eliminated and supplanted by electronic means for securing that motion, while power is transmitted to or from the machine by electric means.

It is another object of the invention to provide a compact and efficient electric motor/generator means operably connected to both the compression pistons and the expansion pistons of the machine, which comprises, for example, in one preferred embodiment a permanent magnet linear alternator having an armature assembly within each such piston and a stator assembly containing an external coil winding surrounding each such piston-armature assembly, each such winding being connected to and made a part of an external electronic quadrature phase locking circuit.

It is another object of the invention to provide an Alpha type Stirling cycle machine which has been deliberately designed to conform to the specific requirements of a resonance-tuned two-degree-of-freedom spring-mass system undergoing forced damped vibration, wherein each of the moving masses of the machine are made to have a given natural frequency of mechanical vibration or resonance equal to the nominal electrical operating frequency of the machine, and whereby the forcing functions are in turn derived from and locked in the precise phase angle required for Stirling cycle operation by the aforementioned electronic quadrature phase locking circuit.

It is another object of the invention to provide the said electronic quadrature phase locking circuit operating apart from but in conjunction with the subject Stirling cycle engine, which circuit in one embodiment comprises a two-phase solid state power semiconductor "ferroresonant" magnetic-coupled multivibrator power converter having an electrical resonance substantially the same as the mechanical resonance of the engine and maintaining the prescribed phase angle by means of the nonlinear action of two magnetic core saturable-reactor devices utilizing feedback techniques, and accompanied by a rechargeable storage battery with sufficient capacity to provide starting current to the system and to accommodate anticipated load variations to be imposed on the system in excess of the nominal or instantaneous capacity of the system.

It is another object of the invention to provide a master microcomputer control subsystem operating in conjunction with and integral to both the engine and the quadrature phase locking circuit, which subsystem will have a variety of specific configurations depending upon the specific application of the invention, i.e., whether it is designed to be used as an electric generator or as an electric heat pump in any or all of the diverse multitude of differing configurations and applications therefor, which in turn dictate the precise specifications for required subsystems with integrated feedback control transducers to be monitored and directed by the operation of the said microcomputer control system.

BRIEF DESCRIPTION OF THE DRAWINGS

The operation of the invention is set forth in the following detailed description, to be read in conjunction with the accompanying drawings wherein.

DESCRIPTION OF A PREFERRED EMBODIMENT

One of the most attractive commercial applications of the invention is in the form of an electric generator directed to the portable and standby power systems market. Quiet, compact, simple, and dependable operation in combination with a remarkably low price is the hallmark of a new class of portable power systems inherently capable of producing both 12 volt DC and standard 120 volt AC electricity. Such an advanced and lightweight powerplant is designed to provide convenient, economical, and fully automatic electric power for boats, camping equipment, recreational vehicles, outdoor lighting, portable power tools, and countless other portable, remote, or mobile power applications throughout the world.

It must be emphasized that the teachings of this invention apply equally well to the technology of either electric generators or of electric heat pumps and refrigeration devices. In fact, if heat is applied to one heat exchanger of the Magnetoelectric Resonance Engine and cold to the other, the machine produces electricity and is known as a Magnetoresonant Generator; yet if the same machine is supplied with electricity instead of heat and cold, the same heat exchangers produce heat and cold effects with near perfect reversibility, and the machine is known as a Magnetoresonant Heat Pump. In order to avoid unnecessary repetition in the following exposition, the invention is explained in the context of a Magnetoresonant Generator.

Figure 1:
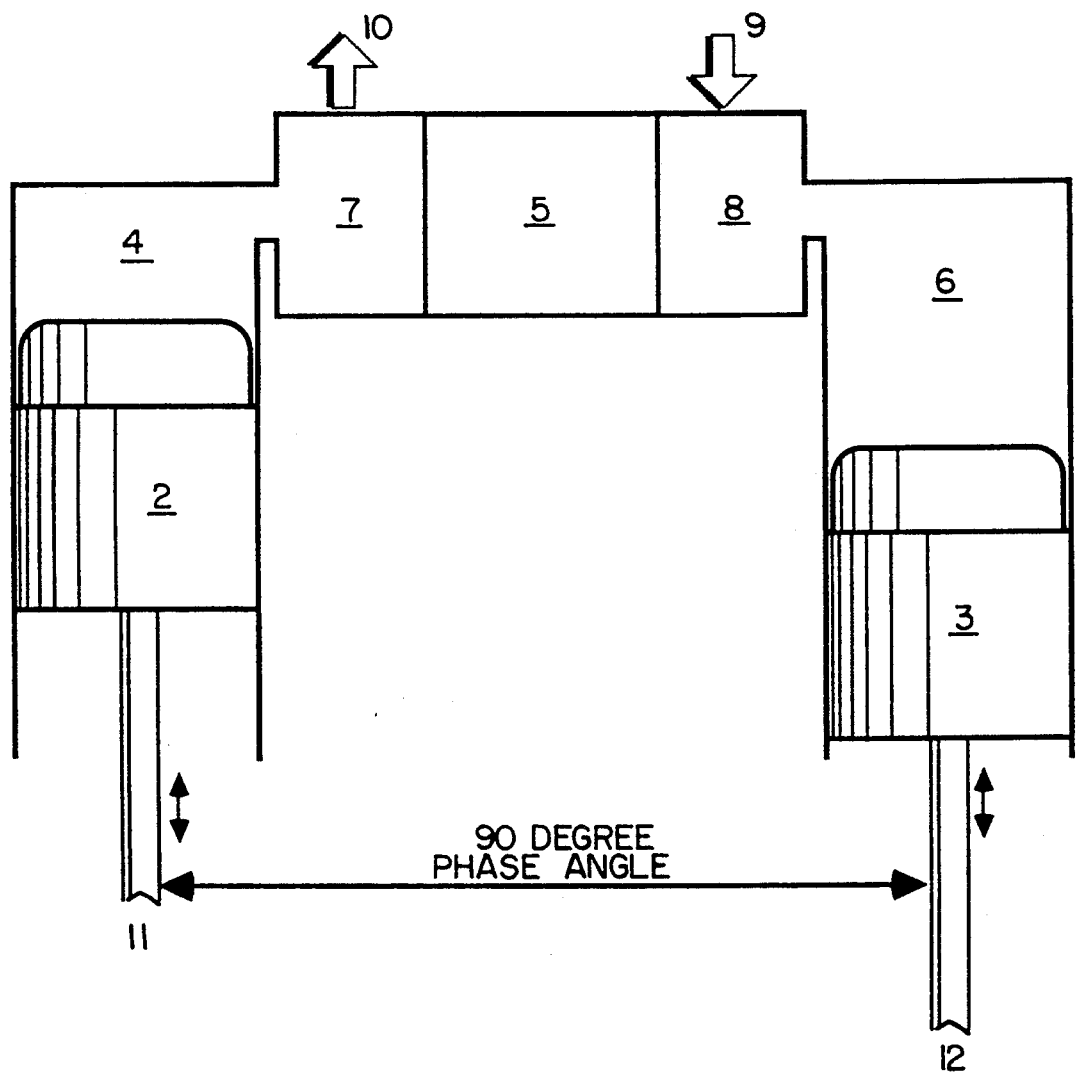
FIG. 1 is a schematic illustration of the operation of a single-acting two-piston Stirling cycle engine, well known as the Alpha configuration.

Accordingly, attention is directed to FIG. 1 which illustrates an idealized version of a prior art two-piston, Alpha type, Stirling cycle prime mover. A conceptually constant mass of pressurized gaseous working fluid occupies the working volume between the compression piston 2 and the expansion piston 3. The total working volume consists of compression space 4, regenerator 5, and expansion space 6. A portion of compression space 4 is continually cooled by cooler 7, while a portion of expansion space 6 is continually heated by heater 8. Arrow 9 represents the inflow of heat by conduction, convection, or radiation (or some combination of these) from an appropriate heat source to the heater 8; arrow 10, the outflow of heat from cooler 7 to a heat sink.

It is well known that the cyclic change in the locus of the working fluid volume in such a machine closely approximates the conditions which comprise the idealized Stirling cycle, so long as the mechanical phase angle imposed on the relative motion of the pistons is 90 degrees or nearly so. The phase angle is often prescribed by the design of a crankshaft, swashplate, or other mechanical means operative with respect to piston rods 11 and 12. Regenerator 5 picks up heat when the gas is compelled to move from the hot side to the cold side and gives up heat to the gas when it is likewise compelled to move in the opposite direction. As a consequence of the 2nd law of thermodynamics, a greater energy is derived from the isothermal expansion of a hot gas than is required for the isothermal compression of a cold gas-ergo the Stirling cycle thermal machine.

In the same manner, the Magnetoelectric Resonance Engine produces electricity by converting the heat from the steady combustion of either gaseous (propane, natural gas, LPG) or liquid (gasoline, diesel, kerosene, alcohol) fuels into mechanical oscillations of a pair of resonance-tuned linear alternators, using electronic means rather than mechanical means to impose the required phase angle upon the motion of the pistons. The performance of the combustion subsystem, as well as that of all other functional parameters of the Magnetoresonant Generator of the invention, is governed by a master microcomputer control system. Thus such generators are completely self-starting and self-regulating, requiring only the provision of fuel and the flip of an ordinary on-off switch.

Figure 2:
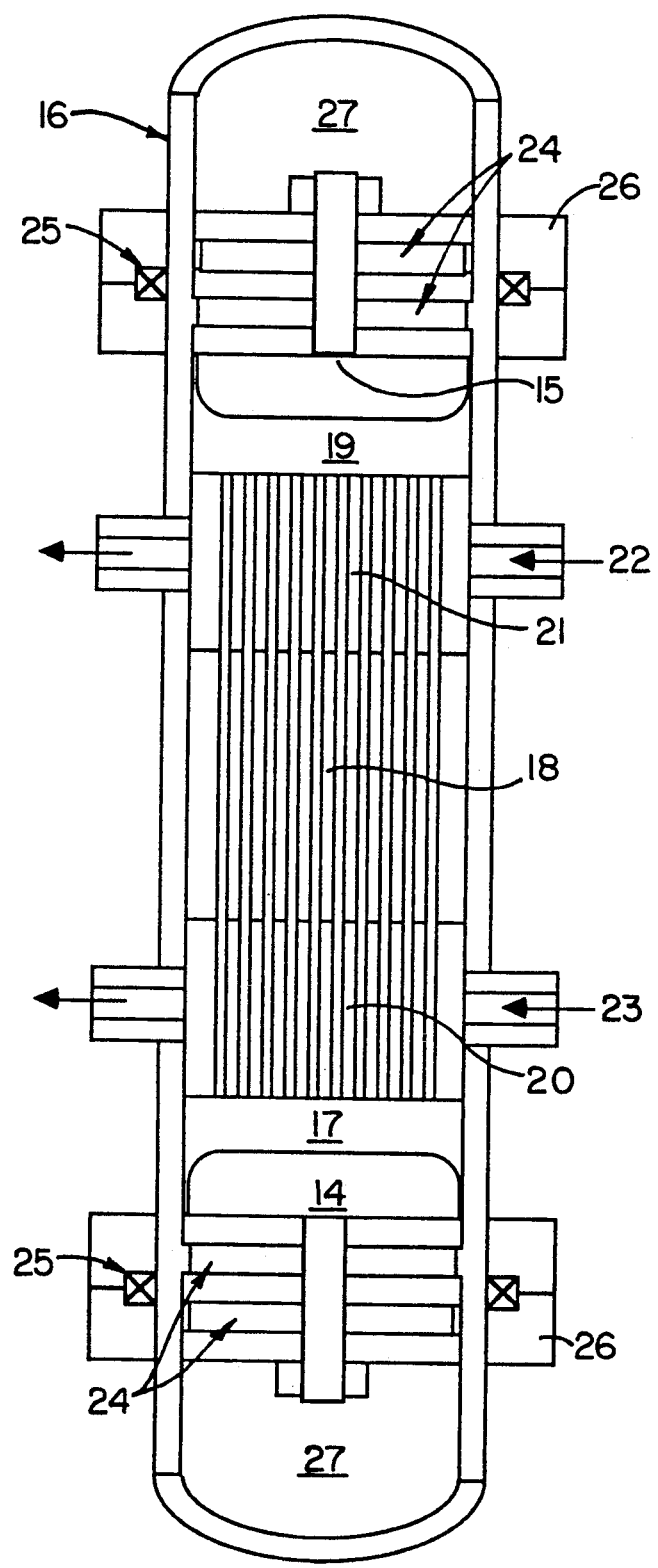
FIG. 2 is a schematic illustration of the construction of a Magnetoelectric Resonance Engine (MRE) according to the invention in the form of a Magnetoresonant Generator which is powered by an Alpha type Stirling cycle engine.

Attention is now directed to FIG. 2. It shows the structure of a Magnetoresonant Generator to have a substantial similarity to that of the Alpha machine in FIG. 1, except that compression piston 14 and expansion piston 15 have no piston rods and are wholly contained within a hermetically sealed cylinder 16. As before, the total working volume consists of compression space 17, regenerator 18, and expansion space 19. A portion of compression space 17 is continually cooled by cooler 20, while a portion of expansion space 19 is continually heated by heater 21. Arrow 22 represents the inflow of heat from an appropriate heat source to heater 21; arrow 23, the outflow of heat from cooler 20 to an appropriate heat sink.

Each of the two pistons 14 and 15 of the Magnetoresonant Generator of FIG. 2, however, contains an armature assembly having powerful permanent magnets 24 to supply the magnetic flux required by each linear alternator. The pistons 14 and 15 are permanently lubricated and oscillate within stationary coils 25 mounted outside working cylinder 16, which coils are embedded within soft iron or similar alloy housings 26 and constitute the stator assembly of each linear alternator. Buffer spaces 27 are filled with additional gas separate from the total working volume, which buffer spaces serve as gas springs with respect to the resonance-tuned oscillations induced in pistons 14 and 15. Additional spring forces are derived from a natural attraction of each permanent magnet armature assembly with respect to its corresponding stator assembly.

These and other details of the operation of the linear alternators which result from the oscillatory motion of pistons 14 and 15 may be discerned by referring to the more detailed illustration of one such alternator in FIG.

Figure 3:
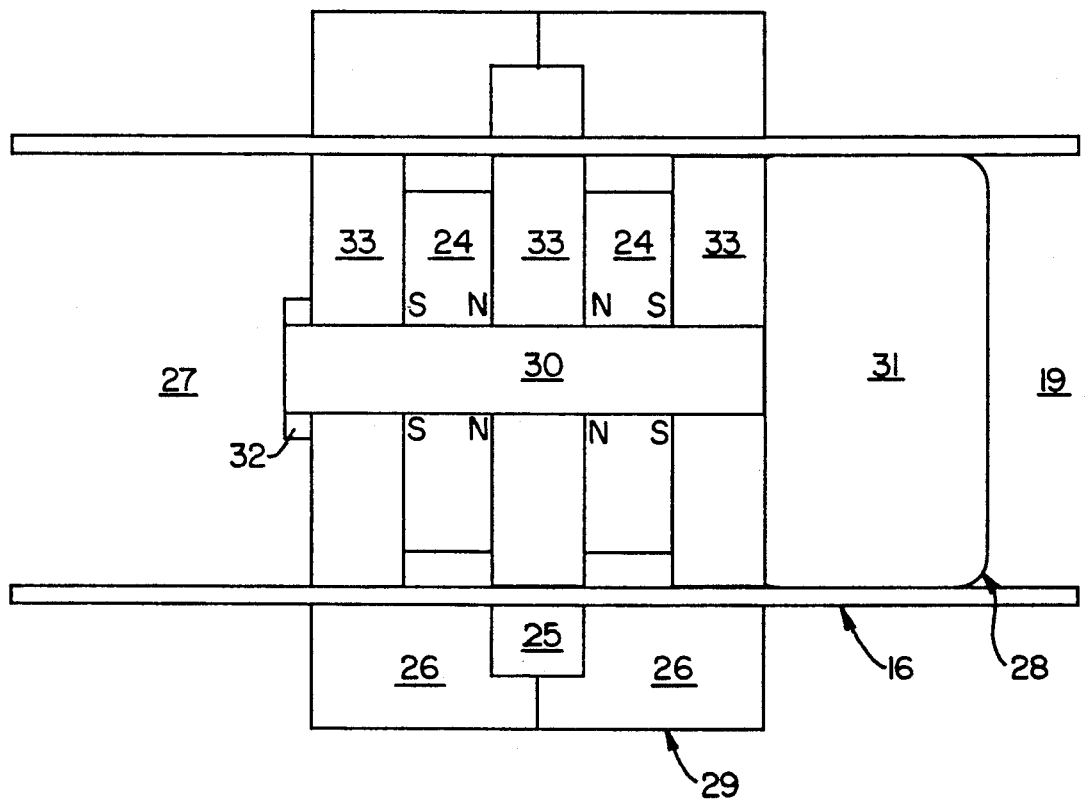
FIG. 3 is a schematic representation of the configuration of a permanent magnet linear alternator according to the invention comprising an internal piston-armature assembly which reciprocates within the working cylinder and of an external stator assembly containing a stationary coil winding.

3. The construction of a Magnetoelectric Resonance Alternator is similar to that of the electrical setback generator described by Buzzell et al. in U.S. Pat. No. 3,981,245 and to that of the electromechanical actuator described by Cummins in U.S. Pat. No. 4,641,072, except that it is designed for continuous periodic motion and for operation as an integral part of Stirling cycle machine pistons 14 and 15. As shown in FIG. 3, a Magnetoelectric Resonance Alternator designed to operate within the expansion space of a Magnetoelectric Resonance Engine comprises a movable interior piston-armature assembly 28 and a stationary exterior stator assembly 29, which configuration is substantially different from that of prior art free piston machines such as that, for example, selected for illustration by Beale in FIG. 6 of this U.S. Pat. No. 4,623,808.

The piston-armature assembly 28 in turn comprises a non-magnetic alloy core structure which includes stem 30, piston cap 31, and fastener 32; three annular rings 33 which are constructed of high-permeability soft magnetic material such as pure iron, Mumetal, or Permalloy and which serve as armature pole pieces; and two high flux permanent magnets 24 such as the rare earth cobalt or neodymium iron boron compositions which have high magnetic energy products and great resistance to demagnetization, the magnets 24 being arranged with opposing polarities as shown. Piston-armature assembly 28 is designed to reciprocate within cylinder 16, the outer circumferences of the three annular rings 33 being suitably lubricated with dry film lubricant or other lubricating means. Piston cap 31 is designed to have low thermal conductivity so as to serve as an insulator or thermal barrier between magnets 24 and the heated working fluid in expansion space 19.

The stator assembly 29 comprises coil 25 which is wound on a bobbin or coil form made of fiberglass-epoxy or a similar non-magnetic material, and two annular stator pole pieces 26 which are made of the same material as the armature pole pieces 33 and which surround coil 25, cylinder 16, and piston-armature assembly 28 so as to provide a more or less complete magnetic circuit for the magnetic flux emanating from magnets 24. An important consequence of this configuration is the existence of a natural null position wherein the flux from magnets 24 is equally and symmetrically divided with respect to the armature pole pieces 33 and to the stator pole pieces 26 and whereby the magnetic flux lines pass predominately through soft magnetic material. Additionally, this configuration results in an inherent magnetic restoring force or spring action which tends to return piston-armature assembly 28 to the null position when it is displaced in either direction along the axis within cylinder 16.

Figure 4A:
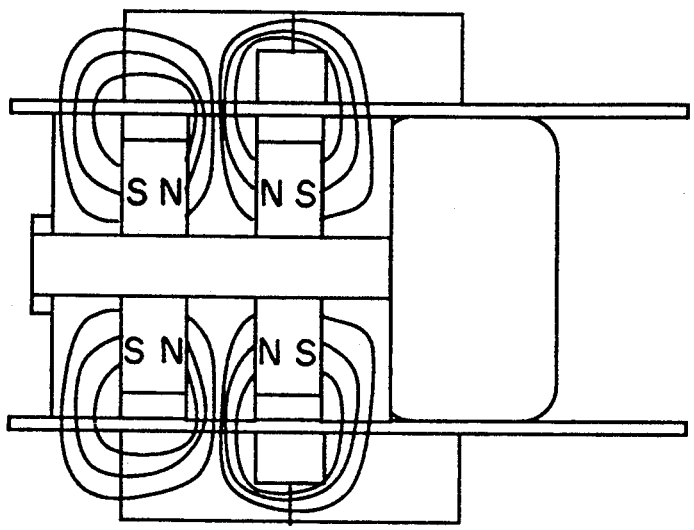
FIG. 4(a), (b), and (c) illustrate schematically the magnetic circuit of a linear alternator according to FIG. 3 as its piston moves from an open- or air-circuit condition at its left-most position through its iron-circuit or null position back to an open- or air-circuit condition at its right most position.
Figure 4B:
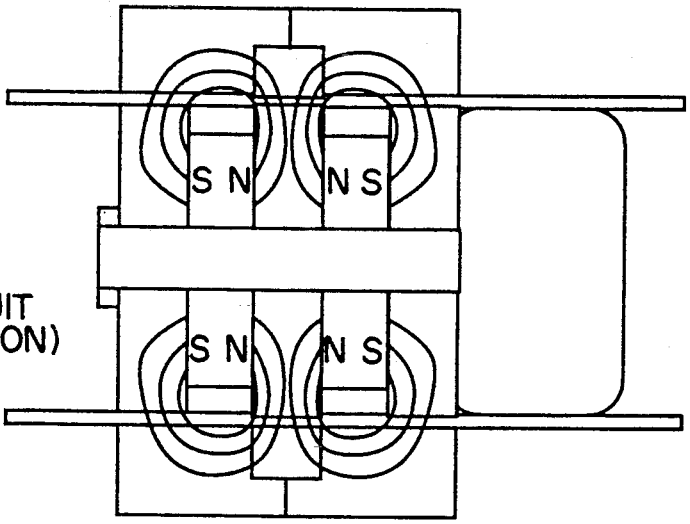
Figure 4C:
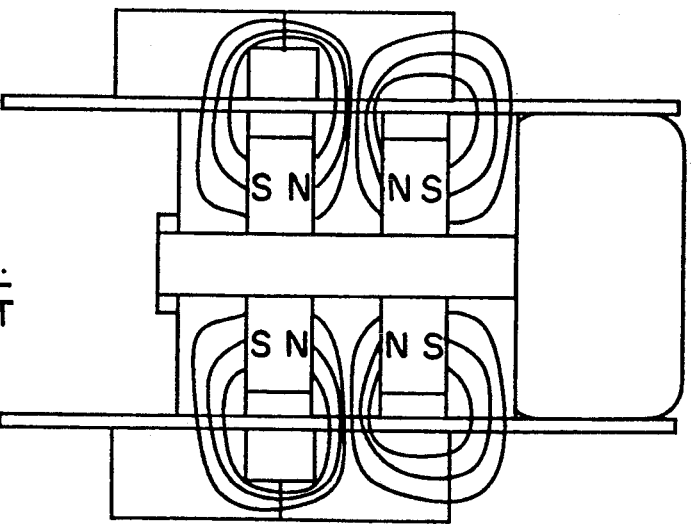

In a manner similar to that taught by U.S. Pat. No. 3,981,245 this invention requires magnets 24 to be alternately operated between closed-circuit or iron-circuit and open-circuit or air-circuit conditions. Referring to FIG. 4, closed-circuit conditions prevail at or near the null position shown in FIG. 4(b) wherein the magnetic flux lines are contained predominately within the ferromagnetic pole pieces of both the armature and the stator. When the piston-armature assembly is displaced to either side of the null position of FIG. 4(b), it moves toward one or the other of the positions shown in FIG. 4(a) and FIG. 4(c) in which the magnetic flux lines extend, at least in part, through the air outside the pole pieces. It is a well-known consequence of the physical laws of electricity and magnetism that the piston-armature assembly shown in either FIG. 4(a) or FIG. 4(c) will produce a magnetomotive force which acts to restore the assembly to the null position shown in FIG. 4(b).

But it is a further well-known consequence of these same physical laws that the motion of the piston-armature assembly as shown between the configuration of FIG. 4(a) and the configuration of FIG. 4(c) will produce a motional induced electromotive force in coil 25 and any external electrical circuit to which it may be connected. This generator action results from the fact that the reciprocation of piston-armature assembly 28 in this manner completely reverses the polarity of the magnetic flux which encircles coil 25 with each complete cycle. It is an important teaching of this invention that the electromagnetic interaction between the piston-armature assembly 28 and the stator assembly 29 is reversible. That is, motion imposed on the piston-armature assembly by the gasdynamic forces of the working fluid tends to generate electric power in the stator assembly, and electric power in the stator assembly tends to produce motion of the piston-armature assembly which in turn imparts gasdynamic forces to the working fluid.

It is an essential teaching of this invention, however, that because each piston-armature assembly is in fact a classic spring-mass-damper vibration system, it has a natural mechanical frequency of resonance which is uniquely determined by the ratio of the restoring force constant and the reciprocating mass. When two of these are deliberately placed under the further mechanical constraints represented by the prior art Alpha type Stirling thermodynamic cycle, i.e., when one is made to be the compression piston and the other is made to be the expansion piston in such a device, an efficient Stirling engine generator results so long as some additional means is provided to impose and to maintain the requisite phase angle of approximately 90 degrees between the motion of these two pistons. The crux of this invention is the fact that the mechanically resonant system is uniquely coupled to an electrically resonant system having the same resonant frequency, and the required mechanical phase angle is maintained by electronic means.

Figure 5:
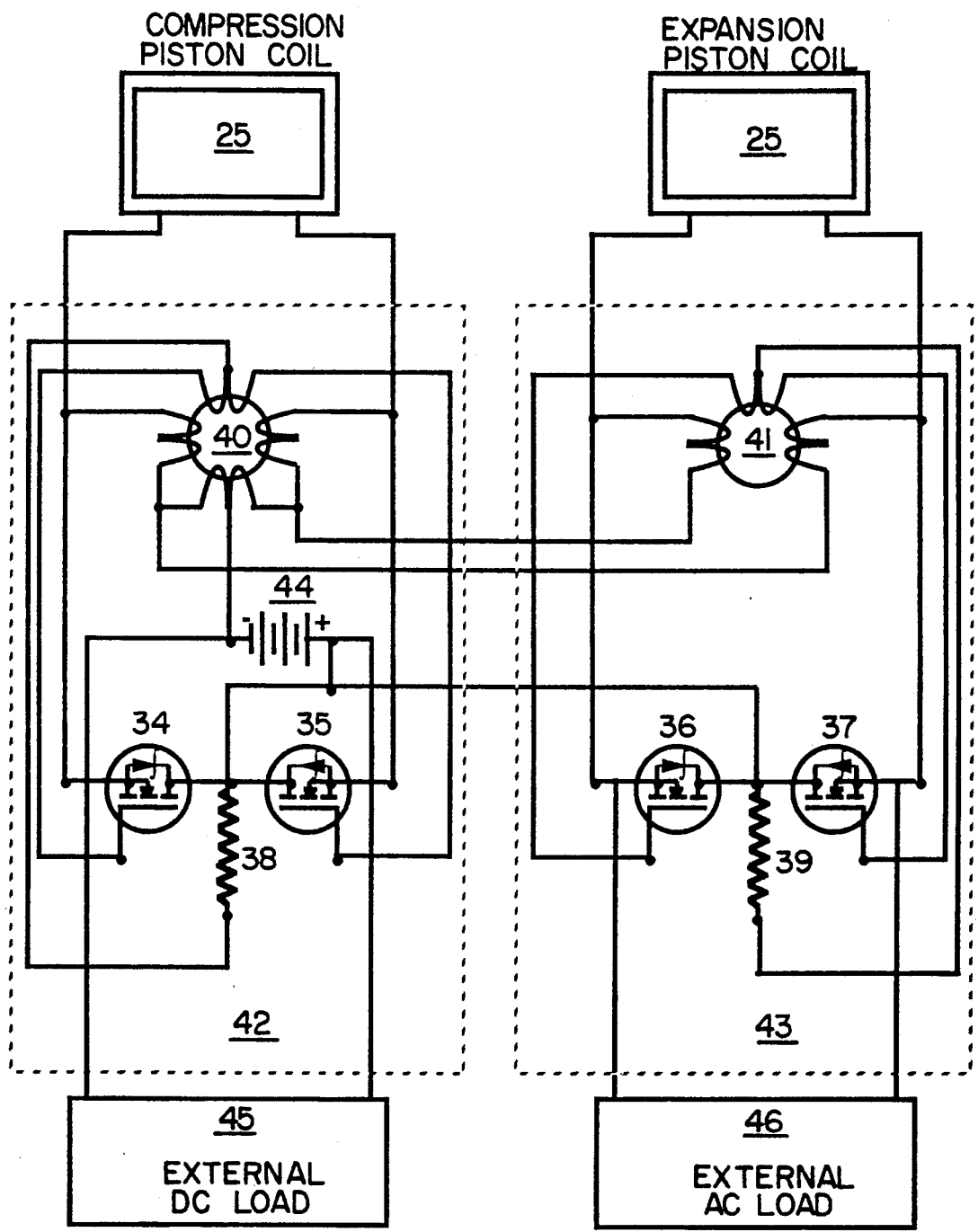
FIG. 5 is a schematic illustration of the two-phase oscillator comprising the Quadrature Phase Lock Circuit necessary for the operation of the MRE.

It is another teaching of this invention that the foregoing result may be most readily accomplished by a quadrature phase-locking circuit of the type diagrammed in FIG. 5. As one preferred embodiment of the invention, the circuit shown in FIG. 5 follows the teachings of W. H. Card who made several significant contributions to the development of polyphase magnetic-coupled multivibrators in the late 1950s (References 14 and 15). A total of four power semiconductor switches such as VMOS (vertical metal oxide semiconductor) field effect transistors, i.e. power MOSFETs such as the HEXFET devices available from International Rectifier, 34, 35, 36, and 37, comprise a two-phase double oscillator which is based upon the fundamental principle of the master-slave power converter. The master oscillator 42 comprises transistors 34 and 35, resistor 38, and a saturable transformer 40; similarly, the slave oscillator 43 comprises transistors 36 and 37, resistor 39, and a saturable transformer 41.

A rechargeable battery 44 is placed in the circuit to supply an appropriate bias voltage to the transistors and to store electrical energy for the system as a whole. The natural frequency of each oscillator is a function of the value of the components and the applied DC bias voltage of the battery, and can be adjusted by trimming the resistance values of resistors 38 and 39. The phase angle between the two oscillators 42 and 43 is a function of the turns ratio of the windings on transformers 40 and 41, which can be fixed such that the slave oscillator 43 vibrates at the same frequency but a different phase angle with respect to the master oscillator 42. With this special design, the two oscillators are locked in synchronism with their square-wave output voltages applied to coils 25 being locked in quadrature, i.e., having a 90 degree electrical phase angle, and each oscillator in fact constitutes an electrical tank circuit which stores energy within the magnetic fields associated with saturable transformers 40 and 41. The circuit is inherently capable of providing either DC current to a DC load 45 or AC current to an AC load 46 as shown.

Thus another specific teaching of this invention is that so long as the resonant electrical frequency of the two-phase oscillator comprising the quadrature phase lock circuit is substantially the same as or harmonic with respect to the resonant mechanical frequency of the piston-armature assemblies comprising the moving parts of the Alpha Stirling engine, a reversible transfer of power between the two systems can be readily accomplished. Because of the symmetrical nature of the circuit configuration and the inherent capability of metal-oxide semiconductor field-effect transistors to switch current in two directions, net power produced by the combined action of the linear alternators as a result of the motive force imparted by the Stirling cycle engine is automatically shunted to an external load, while the battery in the circuit is automatically recharged to full capacity. And since the power within the circuit is present in the form of both alternating and direct current, the invention is inherently capable of supplying either type of current to an external load without the provision of additional circuit components.

Figure 6:
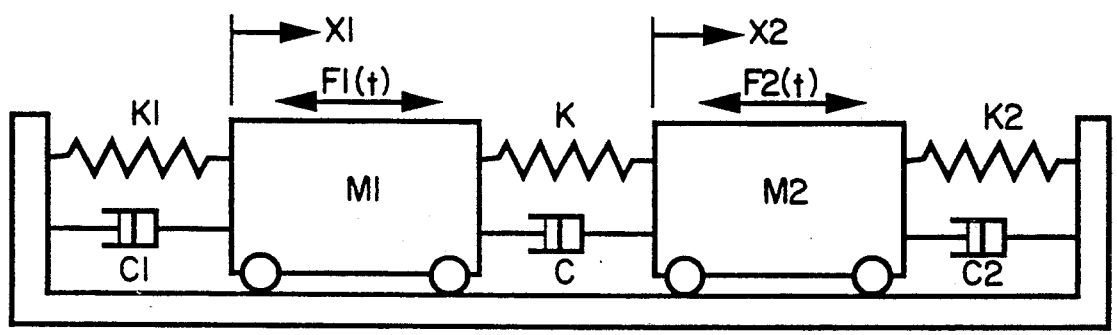
FIG. 6 is an explanatory diagram of the motion of a two-degree-of-freedom spring-mass system with forced damped vibration, representative of the idealized theoretical dynamics of the Magnetoelectric Resonance Engine.

The mechanical dynamics of the invention can be simulated in terms of the idealized representation of motion depicted in FIG. 6. The differential equations of motion are:

$$M1*X1'' + C1*X1' + K1*X1 + K(X1 - X2) + C(X1' - X2') =$$
$$F1(t)M1*X2'' + C2*X2' + K2*X2 + K(X2 - X1) +$$
$$C(X2' - X1') = F2(t)$$

A well-known result of classical mechanics is the fact that a spring-mass system undergoing forced damped vibration will tend to oscillate with the frequency of the imposed forcing function. As shown in FIG. 6, the invention can be represented in terms of two piston masses M1 and M2 subject to the two applied forcing functions F1(t) and F2(t), respectively, and undergoing relative displacements X1 and X2. Spring constants K1 and K2 represent the force-displacement relation resulting from the inherent magnetomotive restoring forces of the piston-armature assembly in combination with the gas pressures in the buffer spaces, while spring constant K represents the force-displacement relation of the magnets in combination with the gaseous working fluid between the two pistons which comprises the total working volume of the Stirling engine. Similarly, the damping coefficients C1, C2, and C simulate the effects of friction and viscous flow losses within these same volumes.

Figure 7:
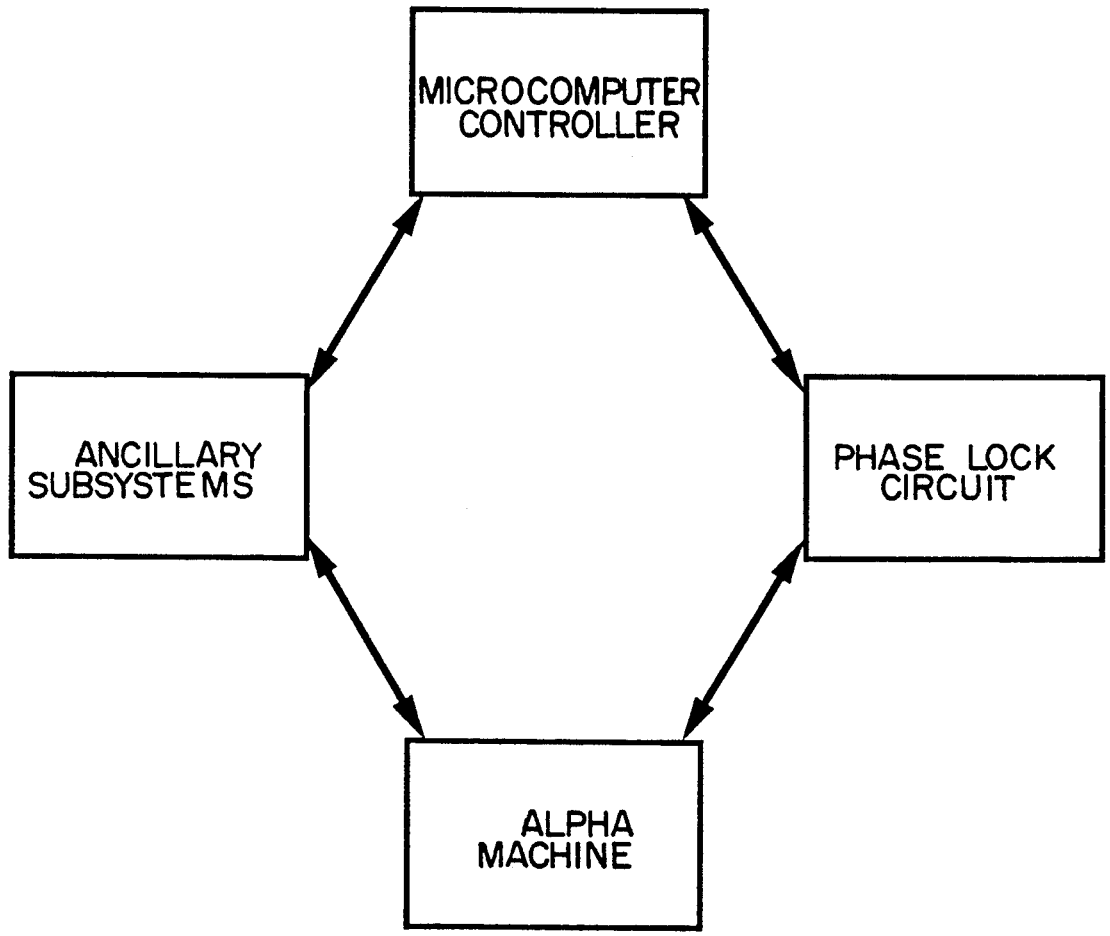
FIG. 7 provides a schematic illustration of the overall system elements of the Magnetoelectric Resonance Engine and their interactions.

So far this description has focussed on only two of the four elements which are essential to the operation of the invention. The overall system configuration of a Magnetoelectric Resonance Engine is illustrated schematically in FIG. 7. The system comprises these four basic elements: (1) a master microcomputer control subsystem sometimes referred to as a microcontroller; (2) a solid state two-phase oscillator quadrature phase lock circuit; (3) a Stirling cycle Alpha type quasi free piston mechanical arrangement; and (4) various ancillary subsystems, the precise nature of which depends upon whether the system is a Magnetoresonant Generator or a Magnetoresonant Heat Pump and the specific application thereof. Therefore, the remainder of the discussion is concentrated on an explanation of the characteristics and performance of the microcomputer controller (microcontroller) and the nature of its interactions with various required ancillary subsystems.

The operation of the Magnetoelectric Resonance Engine is governed by a sophisticated, yet economically producible, master microcomputer control system. Microprocessor control of the various functional subsystems, such as the combustion subsystem required by a propane-fueled Magnetoresonant Generator, for example, is accomplished by digitally processing real time dynamic signals from strategically placed sensors. Combustion air mass flow rate and temperature, the fuel/air mixture ratio, the heater set point temperature, and the cooler operating temperature, among others, are individually controlled and integrated to automatically accommodate a changing electrical load. While the microprocessor is the critical control element in such a system, the system also incorporates modern advances in sensors and transducers, interface electronics, signal conditioning electronics, output control devices, and actuators and displays.

In a basic electronic control system of this type, input signals from sensors and transducers are converted into an input form that can be used by the microprocessor. From an interface standpoint, many sensing inputs may require amplification, buffering, temperature compensation, or analog/digital conversion. The complexity and number of components can be considerably reduced if custom integrated circuits are developed for each application to provide the interface from sensor to microprocessor, and to incorporate modern multiplexing techniques including the use of electrooptical devices and fiberoptic data transmission networks. The combination of signal conditioning with sensing elements to allow direct interface to microprocessors is called "smart sensor" technology. Furthermore, the low current, digital output of the microprocessor must be amplified prior to controlling a power semiconductor or relay which ultimately provides actuation of a solenoid, motor, or other actuator and/or display device. The combination of output signal conditioning with power semiconductor devices is called "smart power" technology.

The heart of the microcomputer control subsystem is the microcontroller itself. A preeminent example of the current state of the art is Motorola Corporation's 32-bit 68332 microcontroller. This large-scale integrated circuit chip comprises 420,000 transistors which permit data to be processed with an accuracy of one part in four billion. This represents an accuracy improvement of about three orders of magnitude in comparison with prior art 16-bit microcontrollers, and the new 68332 chip will also compute faster due to its sub-micron design geometries. In conjunction with single-chip programmable digital signal processors (DSPs) which also feature 32-bit architectures, fixed and floating-point operations, 50-ns cycle time, large on-chip ROM (read-only-memory) and RAM (random-access-memory), instruction cache, concurrent memory access, and a large address area in one continuous memory space. A few DSP manufacturers have also started offering processors with on-chip EPROM (electrically programmable read-only-memory) for ease of prototype development, field testing, and early production runs.

Thus a preferred embodiment of the Magnetoelectric Resonance Engine in a given specific application incorporates a master control subsystem comprising a 32-bit microcontroller, compatible DSPs with on-chip EPROM, and advanced "smart sensor" technology such as Hall-effect position sensors (i.e., UGN/UGS-3055U and UGN/UGS-3131T/U devices available from Sprague Electric Company), negative temperature coefficient thermistors for temperature sensing (i.e., devices from Thermometrics, Inc. or Fenwal Electronics/APD), and bonded-foil pressure sensors (i.e., Model 176A from Robinson-Halpern Co.). And the additional use of advanced "smart power" technology, which combines control circuitry with power output devices such as the power MOSFETs specified for use in the phase lock circuit, provides an effective solution to the problem of interfacing logic to power. Power MOSFETs are preferable to bipolar transistors because they are voltage-driven rather than current-driven devices. This considerably simplifies the interface to a microprocessor or other CMOS outputs.

Finally, it should be emphasized that a preferred embodiment of the Magnetoelectric Resonance Engine may take numerous forms, depending upon whether a given specific application derives from its use as either a Magnetoresonant Generator or as a Magnetoresonant Heat Pump. Clearly, the various ancillary subsystems such as liquid or gaseous fuel combustors, combustion air blowers, coolant circulating pumps, specialized heat exchangers, power line isolation, synchronization, and stabilization equipment, frequency converters, process controllers, energy storage devices and the like which would be appropriate in connection with one such application may not be appropriate to a different application. In the electric generator mode, for example, steady combustion of either gaseous (propane, natural gas, LPG) or liquid (gasoline, diesel, kerosene, alcohol) fuels is required for the production of useful electric power output. On the other hand, an electric heat pump in accordance with the invention would have no combustion subsystem, but would have various other ancillary components such as a forced draft blower or a coolant circulating pump which may be required in the context of a specific application.

ADVANTAGES AND NEW FEATURES

The following attributes are considered to be the primary advantages and novel features of the Magnetoelectric Resonance Engine disclosed herein as compared to the prior art:

(1) Because the maximum transfer of power is known to occur between resonance-tuned structures, the strategy of coupling a resonant mechanical system to a similarly resonant electrical system to obtain reversible power transfer between the two systems is a clear advantage and novel aspect of the present invention. The choice of an Alpha type Stirling cycle machine and the deliberate implementation of the design in terms of a two-degree-of-freedom spring-mass system under forced damped vibration leads to an ultimate design simplicity and the minimum number of component parts. The fact that the invention is an Alpha machine and incorporates a linear alternator within both the expansion piston and the compression piston sets it completely apart from the Beta and Gamma free piston machines of the prior art. Quiet and dependable operation, long life, and low cost are the anticipated results of this novel technical approach.

(2) The electronic quadrature phase locking circuit of the invention incorporates the most recent technology in power semiconductor devices in concert with saturable-core magnetic amplifier techniques which are known to result in high power density, simple control circuitry, excellent regulation, and rugged performance in comparison with alternative methods of control. The use of this circuit provides dynamic stability under load typical of kinematic type Stirling engines with large flywheels. But the invention is inherently more compact and lightweight than these, and retains the inherent simplicity of free piston machines without their tendency to change both frequency and power level with changes in load. And it is uniquely suited for generating both direct and alternating current, in the case of the Magnetoresonant Generator, or for operation from either AC or DC power supplies, in the case of the Magnetoresonant Heat Pump.

(3) The operation of the Magnetoelectric Resonance Engine is governed by a sophisticated, yet economically producible, master microcomputer control system. Microprocessor control of the various functional subsystems, such as the combustion subsystem required by a propane-fueled Magnetoresonant Generator, for example, is accomplished by digitally processing real time dynamic signals from strategically placed sensors. Combustion air mass flow rate and temperature, the fuel/air mixture ratio, the heater set point temperature, and the cooler operating temperature, among others, are individually controlled and integrated to automatically accommodate a changing electrical load. The incorporation of advanced microcontroller electronics to achieve optimum performance ensures that each specific application of the invention is homogeneous and trouble-free. The Magnetoelectric Resonance Engine is ideally suited to the incorporation of advanced integrated circuits, devices, and mass production techniques to achieve low cost adaptive control of all system and subsystem operational and performance parameters. These technologies increase reliability, performance, efficiency, and convenience while reducing both cost and complexity.

(4) The implementation of a new and improved family of Alpha type Stirling cycle machines which are mechanically uncomplicated and economical to produce on a large scale, and which have a compact hermetically sealed configuration, quiet and automatic operation in either an electric generator mode or an electric heat pump mode, and the highest possible degree of reliability offers a dramatic advantage over competing alternatives. The unique quasi free piston mechanical arrangement having one or more pairs of opposed pistons in a single hermetically sealed cylinder whereby the traditional use of cranks, connecting rods, swash plates, cams and other mechanical components normally used to constrain the motion of the pistons in the requisite phase relationship is eliminated and these components are supplanted by electronic means for securing that on, while power is transmitted to or from the machine by electric means, ensures the technical and commercial superiority of the Magnetoelectric Resonance Engine.

ALTERNATIVE CONFIGURATIONS

Figure 8:
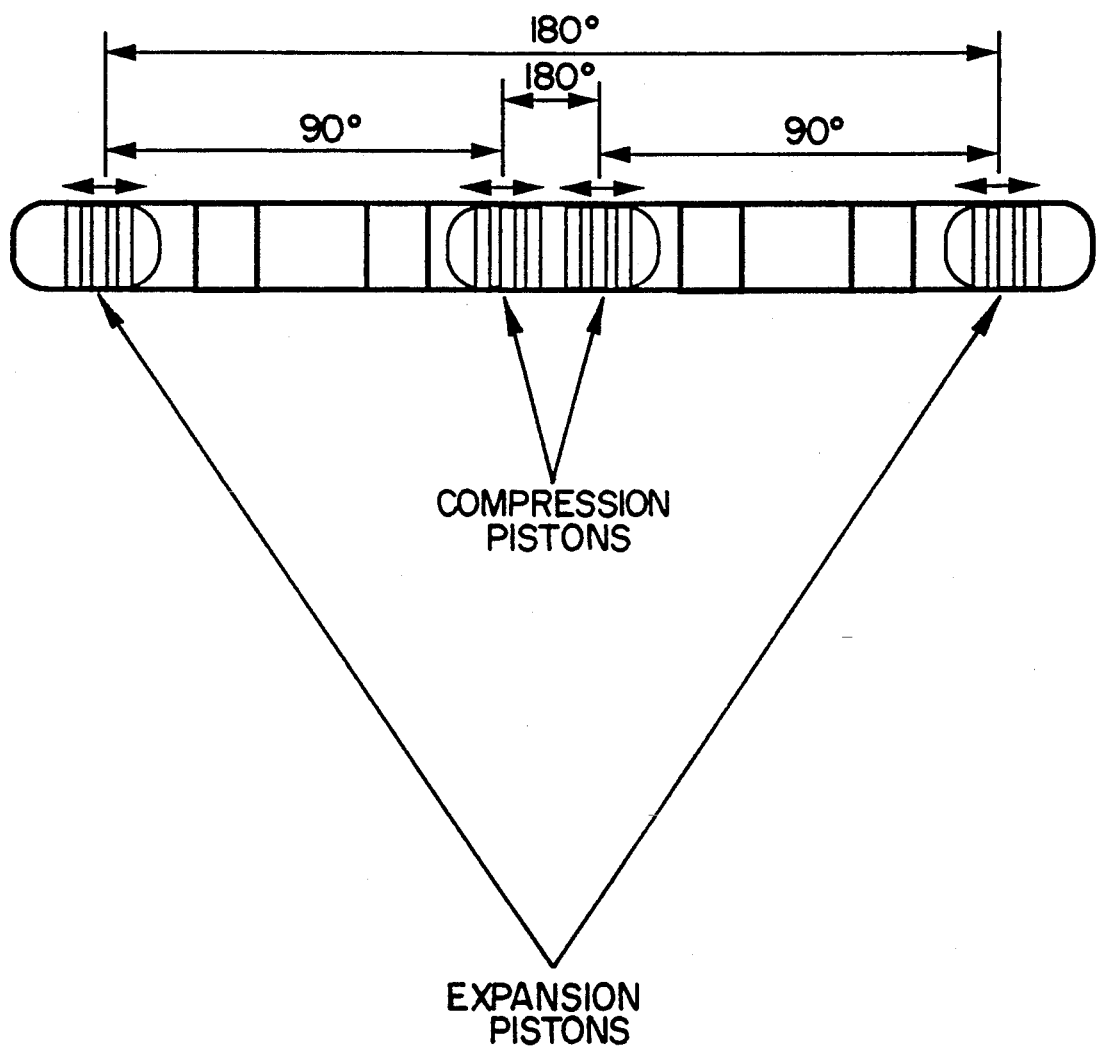
FIG. 8 is a schematic illustration of an alternative configuration of a multicylinder Magnetoelectric Resonance Engine which is dynamically balanced and inherently free of undesirable vibrations.

A principal alternative group of configurations of the Magnetoelectric Resonance Engine is a deliberate juxtaposition of two or more pairs of pistons to achieve dynamic balancing. In the simplest case, for example, a machine is constructed so that two compression pistons are compelled to oscillate in direct opposition (having a 180 degree phase angle) to one another in the center of a single cylinder, while the two corresponding expansion pistons also have a 180 degree phase relationship and are situated toward the opposite ends of the cylinder as shown in FIG. 8. By this means it is possible to have the required 90 degree phase angle between each pair of compression/expansion piston sets, but the opposed motion of each pair of compression and expansion pistons with respect to each other permits the simultaneous cancellation of net vibrational forces which would otherwise be imparted to the cylinder and the engine mounting structure.

Another principal alternative group of configurations comprises the use of various alternative means for achieving an electromagnetic/electronic coupling between the compression and expansion pistons and their respective external electric drive elements. The essential requirement of the invention in this regard is the provision of any reversible motor/generator means capable of both driving and being driven by the resonant motion of each piston in the context of its role as a tuned mechanical oscillator. In the preferred embodiment described above, the given motor/generator means is that of a permanent magnet linear alternator, but it is quite possible that desirable alternative configurations may incorporate different motor/generator means such as electromagnetic induction motor/generator technology, electrostatic induction motor/generator technology, piezoelectric or electrostrictive motor/generator technology, and piezomagnetic or magnetostrictive motor/generator technology. In the same manner, for example, that electroacoustic transducers (i.e., loudspeakers) differ in construction from the use of permanent magnet/coil devices to the use of piezoelectric film devices, the invention may also differ in construction in this respect.

Figure 9:
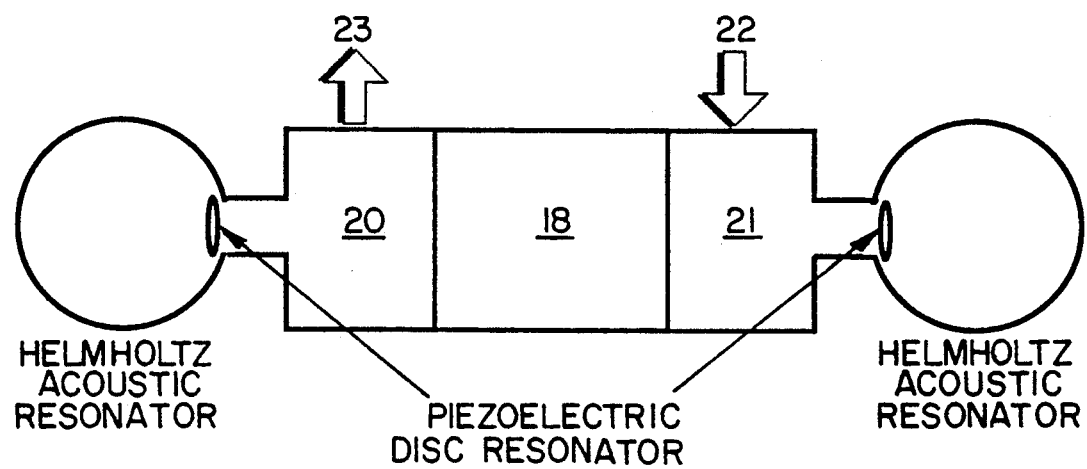
FIG. 9 is a schematic illustration of another alternative configuration of a Magnetoelectric Resonance Engine which incorporates Helmholtz acoustic resonators and piezoelectric driver elements to permit its operation as an acoustic resonance heat pump or closed-cycle cryocooler.

An illustrative example of such an alternative Magnetoelectric Resonance Engine is that of an electrically driven acoustic resonance heat pump or closed-cycle cryocooler incorporating piezoelectric motor/generator technology. As shown in FIG. 9 this is accomplished by employing the well-known Helmholtz acoustic resonator in conjunction with commercially available piezoelectric disc resonators. The Helmholtz resonator is the simplest and most often utilized acoustical resonator and comprises a straight tube of a given length and cross-sectional area connected to a given volume having virtually any shape. The configuration shown permits the body of two Helmholtz resonators to be the buffer spaces of the machine and the fluid columns in the neck of the resonators to be the pistons of the machine, while the reversible electric motor/generator means formerly accomplished by the aforementioned linear alternator/motor structure is now accomplished by piezoelectric motor/generator means. A device based on this configuration of the Magnetoelectric Resonance Engine will find application in the field of Stirling cycle cryocoolers for superconductor devices or for electrooptical devices operated at cryogenic temperatures such as missile seekers.

At this point it should be emphasized that such an alternative Magnetoelectric Resonance Engine is similar in function to the so-called thermoacoustic engines recently described by G. W. Swift (Reference 19), but is fundamentally different in that the operation of the regenerator in a Stirling cycle machine is thermally different from that of the thermoacoustic engine stack plate assembly, and also because, as Swift points out, the time phasing between pressure and velocity in the Stirling engine is that of a traveling wave and in the thermoacoustic engine is that of a standing wave. Moreover, the essence of the Magnetoelectric Resonance Engine is the deliberate use of the aforementioned electronic quadrature phase lock circuit to ensure the proper phase angle between two separate reversible motor/generator elements in the classic Alpha Stirling cycle mechanical arrangement, whereas no such opportunity for phase angle control is possible in the thermoacoustic engines of the present state of the art.

REFERENCES

1. Kirkley, D. W., 1962; "Determination of the Optimum Configuration for a Stirling Engine", J. Mech. Eng. Sci., 4/:204-12.
2. West, C. D., 1986; "Principles and Applications of Stirling Engines", New York: Van Nostrand Reinhold Company.
3. Urieli, I., and Berchowitz, D. M., 1984; "Stirling Cycle Engine Analysis", Bristol: Adam Hilger Ltd.
4. Beale, W. T., 1969; "Free-piston Stirling Engines–Some Model Tests and Simulations", SAE Paper No. 690230.
5. Beale, W. T., 1971; "Stirling Cycle Type Thermal Device", U.S. Pat. No. 3,552,120.
6. Cooke-Yarborough, E. H., 1967; "A Proposal for a Heat-Powered Nonrotating Electrical Alternator", Harwell Memorandum AERE-M881 UK AERE.
7. Cooke-Yarborough, E. H., 1970; "Heat Engines", U.S. Pat. No. 3,548,589.
8. Cooke-Yarborough, E. H.; Franklin, E.; Geisow, J.; Howlett, R.; and West, C. D.; 1974; "Harwell Thermo-Mechanical Generator", Proc. 9th IECEC, Paper No. 749156.
9. Benson, G. M., 1977; "Thermal Oscillators", Proc. 12th IECEC, Paper No. 779247.
10. Walker, G. and Senft, J. R., 1985; "Free Piston Stirling Engines", New York, Heidelberg, Berlin/: Springer-Verlag.
11. Walker, G., 1980; "Stirling Engines", Oxford: Clarendon Press.
12. Vincent, R. J.; Rifkin, D. W.; and Benson, G. M.; 1980; "Analysis and Design of Free-Piston Stirling Engines—Dynamics and Thermodynamics", Proc. 15th IECEC, Paper No. 809334.
13. Slaby, J. G., 1985; "Overview of Free-Piston Stirling Technology at the NASA Lewis Research Center", NASA TM-87156.
14. Geyger, W. A., 1964; "Nonlinear-Magnetic Control Devices", New York/: McGraw-Hill.
15. Card, W. H., 1958; "Transistor-Oscillator Induction-Motor Drive", AIEE Transactions, Vol. 77, Part I, pp. 531-35.
16. Buzzell, C. E. and Ziemba, R. T., 1976; "Electrical Setback Generator", U.S. Pat. No. 3,981,245.

17. Beale, W. T. and Scheck, C. G., 1986; "Electromechanical Transducer Particularly Suitable for a Linear Alternator Driven by a Free-Piston Stirling Engine", U.S. Pat. No. 4,623,808.
18. Cummins, R. D., 1987; "Electro-Mechanical Actuator", U.S. Pat. No. 4,641,072.
19. Swift, G. W., 1988; "Thermoacoustic Engines", Journal of the Acoustical Society of America, Vol. 84, No. 4, October 1988.

OPERATION AND SCOPE OF THE INVENTION

The Magnetoelectric Resonance Engine can be expected to have broad application in the technology of both electric generators (Magnetoresonant Generators) and electric heat pumps (Magnetoresonant Heat Pumps). In the field of generators, Magnetoresonant Generators produces both 12-volt DC and standard 120-volt AC electricity, for example, in order to provide quiet, compact, convenient, and economical power sources for boats, camping equipment, construction sites, and countless other portable, remote, mobile, or standby power applications. These applications may be broadly categorized as follows: (1) portable power systems; (2) marine power systems; (3) remote power systems; (4) residential power systems; (5) industrial power systems; (6) health care power systems; (7) military power systems; (8) space power systems; and (9) Stirling-electric drive or propulsion systems.

Since the closed cycle Stirling engine operates solely on the basis of the difference in temperature in the working fluid between the hot expansion space and the cold compression space, the development of useful power output from the Magnetoresonant Generator is not specific to the source of heat available for use. Therefore the design of the heat source can be any one of a large variety of possible types. In the field of small portable power systems, for example, the Magnetoresonant Generator is designed to produce electricity by converting the heat from the steady combustion of either gaseous (propane, natural gas, LPG) or liquid (gasoline, diesel, kerosene, alcohol) fuels. This inherent capability for multiple fuel operation is among the most important marketing advantages possessed by the invention in comparison to generators powered by the familiar internal combustion engine.

In the field of heat pumps and refrigerators, Magnetoresonant Heat Pumps consume electric power in order to produce heating and cooling effects in all manner of heat pump, refrigerator, air conditioning, cooling, chilling, and freezing devices and applications. These include but are by no means limited to the design of new consumer products such as residential heat pumps and window air conditioners, industrial process chillers, air and other gas liquefaction plants, food processing equipment and freezers, automotive air conditioners, and cryogenic devices such as closed-cycle cryocoolers to name just a few. It may be readily appreciated by those skilled in the art that the Magnetoresonant Heat Pump is appreciably more efficient than the conventional vapor cycle reciprocating refrigeration devices which now dominate world markets in these applications.

In view of the foregoing, it should be apparent to all that the operation of the Magnetoelectric Resonance Engine may be accomplished by means of and in the context of an enormous variety of diverse applications. In fact, virtually every market in the world which is currently served by the application of a reciprocating internal combustion engine generator, or by the application of a vapor cycle, absorption, or other type of electrically powered refrigeration device, is subject to improvement by virtue of the diligent application of the teachings of this invention. It is therefore to be understood that within the scope of the appended claims the invention may be practiced otherwise than as specifically described herein.

I claim:

1. A magnetoelectric resonance thermal machine comprising: (1) a reciprocating, multiple-piston, Alpha-type Stirling-cycle mechanical assembly having at least one pair of opposed pistons in a hermetically sealed cylinder, each piston being a mechanical oscillator having a given natural frequency of mechanical resonance harmonic with respect to the nominal electrical operating frequency of the machine and incorporating reversible electric motor/generator means operatively connected to an electrical oscillator having the same natural frequency as the mechanical oscillator; (2) an electronic quadrature phase-lock circuit incorporating a two-phase power oscillator operating in conjunction with each pair of pistons permitting their motion closely to approximate that of a classic two-degree-of-freedom spring-mass system undergoing forced damped vibration and imposing a prescribed phase angle upon both the mechanical oscillators and the electrical oscillators of the machine; (3) an ancillary external energy and mass transfer subsystem; and (4) a master microcomputer control system whereby said ancillary external energy and mass transfer subsystem is controlled to achieve automatic operation of the machine within the performance specifications of a given field of its application.

2. A reciprocating, multiple-piston, Alpha type Stirling cycle thermal machine having a mechanical arrangement comprising: a frame; a hermetically sealed right circular cylinder mounted in said frame and filled with pressurized gaseous working fluid, said cylinder enclosing one or more pairs of pistons designed to reciprocate therein, each pair of said pistons consisting of one expansion piston and one compression piston arranged in opposition to one another and within one or more isolated stages comprising a buffer space, an expansion piston, an expansion space, a heater, a regenerator, a cooler, a compression space, a compression piston, and a buffer space connected in series by passages permitting oscillating fluid flow between said spaces, the expansion piston reciprocating substantially within the expansion space and the compression piston reciprocating substantially with the compression space thereof; each of the said pistons being designed to have a given natural frequency of mechanical vibration or resonance substantially the same as or harmonic with respect to the nominal electrical operating frequency of the machine and containing a piston-armature assembly associated with and operatively connected to a corresponding stationary stator coil assembly mounted on the exterior of and coaxial with respect to said cylinder and said piston-armature assembly in a manner which constitutes a linear alternator/motor assembly; each pair of said pistons being arranged to oscillate within the context of linear alternator/motor operation in the manner of a classic two-degree-of-freedom spring-mass vibration system undergoing forced damped vibration; each pair of said pistons and the corresponding pair of said linear alternator/motor assemblies being associated with and made an operative part of an electronic quadrature phase lock circuit comprising a two-phase oscillator having an electrical resonance substantially the same as or harmonic with respect to the said mechanical resonance of the said pistons and arranged in the manner of a master-slave relationship, the master oscillator being designed to have substantially the same resonant frequency as that of the slave oscillator but an electric phase angle of approximately 90 degrees with respect thereto, and each said electronic quadrature phase lock circuit having a rechargeable electric storage battery or other DC bias source within the circuit; an external heat source associated with each said heater; an external heat sink associated with each said cooler; each said heater comprising a heat exchanger element serving to thermally conductively connect said heat source to the machine working fluid; each said cooler comprising a heat exchanger element serving to thermally conductively connect said heat sink to the machine working fluid; an external electric power source or supply associated with the machine whenever it is operated in a heat pump mode and serving to drive the said linear motor assemblies therein; an external electric power sink or load associated with the machine whenever it is operated in a generator mode and is being driven by the said linear alternator assemblies therein.

3. A thermal machine according to claim 1 wherein the said pistons are the fluid columns of Helmholtz acoustic resonators and the said reversible electric motor/generator means are piezoelectric disc resonators so as to permit its operation as an acoustic resonance heat pump or closed-cycle cryocooler.

4. A thermal machine according to claims 1 or 2 wherein two or more pairs of pistons are disposed within the working cylinder so that a given pair of compression pistons are compelled to oscillate in direct opposition to one another, that is, having a 180 degree phase angle, while a corresponding pair of expansion pistons is similarly compelled to oscillate with a 180 degree phase relationship, all while maintaining the prescribed phase angle of approximately 90 degrees between each operative pair of compression/expansion piston sets within each said isolated stage comprising a buffer space, an expansion space, a heater, a regenerator, a cooler, a compression space, and a buffer space connected in series by passages permitting oscillating fluid flow between said spaces, in a manner which permits the achievement of dynamic balancing or the simultaneous cancellation of net vibrational forces which would otherwise be imparted to the cylinder and the machine mounting structure.

* * * * *